(12) United States Patent
Chen et al.

(10) Patent No.: US 7,693,419 B1
(45) Date of Patent: Apr. 6, 2010

(54) OPTICAL SPECTRUM ANALYSIS USING OPTICAL INTERFEROMETRY

(75) Inventors: Xiaojun Chen, San Gabriel, CA (US); Lianshan Yan, Monterey Park, CA (US); X. Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 603 days.

(21) Appl. No.: 11/562,961

(22) Filed: Nov. 22, 2006

Related U.S. Application Data

(60) Provisional application No. 60/739,189, filed on Nov. 23, 2005.

(51) Int. Cl.
*H04B 10/08* (2006.01)
*H04B 10/06* (2006.01)

(52) U.S. Cl. .......................... 398/25; 398/34; 398/202; 398/212; 398/213; 398/214

(58) Field of Classification Search .................. 359/583, 359/584; 356/451, 452, 453, 477; 398/25, 398/34, 202, 212, 213, 214
See application file for complete search history.

(56) References Cited

U.S. PATENT DOCUMENTS

| | | | |
|---|---|---|---|
| 3,302,028 A | 1/1967 | Sterzer | |
| 3,684,350 A | 8/1972 | Wentz | |
| 3,719,414 A | 3/1973 | Wentz | |
| 4,461,543 A | 7/1984 | McMahon | |
| 4,798,436 A | 1/1989 | Mortimore | |
| 5,251,057 A | 10/1993 | Guerin et al. | |
| 5,301,101 A | 4/1994 | MacArthur et al. | |
| 5,317,445 A | 5/1994 | DeJule et al. | |
| 5,373,393 A | 12/1994 | DeJule et al. | |
| 5,381,250 A | 1/1995 | Meadows | |
| 5,475,525 A | 12/1995 | Tournois et al. | |
| 5,561,726 A | 10/1996 | Yao | |
| 5,723,856 A | 3/1998 | Yao et al. | |
| 5,751,747 A | 5/1998 | Lutes et al. | |
| 5,777,778 A | 7/1998 | Yao | |
| 5,796,510 A | 8/1998 | Yao | |
| 5,894,362 A | 4/1999 | Onaka et al. | |
| 5,917,179 A | 6/1999 | Yao | |
| 5,929,430 A | 7/1999 | Yao et al. | |
| 5,978,125 A | 11/1999 | Yao | |
| 6,104,492 A | 8/2000 | Giles et al. | |
| 6,178,036 B1 | 1/2001 | Yao | |
| 6,246,818 B1 | 6/2001 | Fukushima | |
| 6,339,405 B1 | 1/2002 | Gleener | |
| 6,351,323 B1 | 2/2002 | Onaka et al. | |
| 6,389,197 B1 | 5/2002 | Ilchenko et al. | |

(Continued)

OTHER PUBLICATIONS

M.A. Davis et al., "Application of a Fiber Fourier Transform Spectrometer to the Detection of Wavelength-Encoded Signals from Bragg Grating Sensors", Jul. 1995, Journal of Lightwave Technology, vol. 13, No. 7, pp. 1289-1295.*

(Continued)

*Primary Examiner*—Ken N Vanderpuye
*Assistant Examiner*—Daniel G Dobson
(74) *Attorney, Agent, or Firm*—Fish & Richardson P.C.

(57) ABSTRACT

Techniques and devices that use polarization rotation and optical interferometry to provide optical spectrum analysis of an optical signal.

17 Claims, 6 Drawing Sheets

U.S. PATENT DOCUMENTS

| | | |
|---|---|---|
| 6,417,957 B1 | 7/2002 | Yao |
| 6,417,965 B1 | 7/2002 | Ye et al. |
| 6,473,218 B1 | 10/2002 | Maleki et al. |
| 6,476,959 B2 | 11/2002 | Yao |
| 6,480,637 B1 | 11/2002 | Yao |
| 6,487,233 B2 | 11/2002 | Maleki et al. |
| 6,487,336 B1 | 11/2002 | Yao |
| 6,488,861 B2 | 12/2002 | Iltchenko et al. |
| 6,493,474 B1 | 12/2002 | Yao |
| 6,498,869 B1 | 12/2002 | Yao |
| 6,535,328 B2 | 3/2003 | Yao |
| 6,567,436 B1 | 5/2003 | Yao et al. |
| 6,576,886 B1 | 6/2003 | Yao |
| 6,580,532 B1 | 6/2003 | Yao et al. |
| 6,583,900 B2 | 6/2003 | Onaka et al. |
| 6,594,061 B2 | 7/2003 | Huang et al. |
| 6,628,850 B1 | 9/2003 | Yao |
| 6,628,861 B1 | 9/2003 | Yao |
| 6,628,862 B1 | 9/2003 | Yao |
| 6,661,941 B1 * | 12/2003 | Yao .................... 385/15 |
| 6,687,423 B1 | 2/2004 | Yao |
| 6,724,526 B1 | 4/2004 | Onaka et al. |
| 6,754,404 B2 | 6/2004 | Yao |
| 6,785,042 B1 | 8/2004 | Onaka et al. |
| 6,795,481 B2 | 9/2004 | Maleki et al. |
| 6,795,616 B2 | 9/2004 | Yao |
| 6,836,327 B1 | 12/2004 | Yao |
| 6,873,631 B2 | 3/2005 | Yao et al. |
| 6,873,783 B1 | 3/2005 | Yao |
| RE38,735 E | 5/2005 | Yao |
| 6,937,798 B1 | 8/2005 | Yao et al. |
| RE38,809 E | 10/2005 | Yao |
| 6,975,454 B1 | 12/2005 | Yan et al. |
| 7,027,198 B2 | 4/2006 | Yao |
| 7,067,795 B1 | 6/2006 | Yan et al. |
| 7,154,659 B1 | 12/2006 | Yao et al. |
| 7,157,687 B1 | 1/2007 | Yao |
| 7,218,436 B2 | 5/2007 | Yao |
| 7,227,686 B1 | 6/2007 | Yan et al. |
| 7,233,720 B2 | 6/2007 | Yao |
| 7,265,836 B1 | 9/2007 | Yao |
| 7,265,837 B1 | 9/2007 | Yao |
| 7,343,100 B2 | 3/2008 | Yao |
| 7,372,568 B1 | 5/2008 | Yao |
| 7,382,962 B1 | 6/2008 | Yao |
| 7,391,977 B2 | 6/2008 | Yao |
| 7,436,569 B2 | 10/2008 | Yao et al. |
| 7,466,471 B2 | 12/2008 | Yao |
| 2002/0101633 A1 | 8/2002 | Onaka et al. |
| 2003/0081874 A1 | 5/2003 | Yao |
| 2003/0095736 A1 | 5/2003 | Kish, Jr. et al. |
| 2004/0037495 A1 | 2/2004 | Yao |
| 2004/0252999 A1 | 12/2004 | Onaka et al. |
| 2005/0013330 A1 | 1/2005 | Kish, Jr. et al. |
| 2005/0013331 A1 | 1/2005 | Kish, Jr. et al. |
| 2005/0013332 A1 | 1/2005 | Kish, Jr. et al. |
| 2005/0018178 A1 * | 1/2005 | Schloss et al. .............. 356/216 |
| 2005/0018720 A1 | 1/2005 | Kish, Jr. et al. |
| 2005/0018721 A1 | 1/2005 | Kish, Jr. et al. |
| 2005/0041922 A1 | 2/2005 | Yao |
| 2005/0168659 A1 | 8/2005 | Melton |
| 2005/0200941 A1 | 9/2005 | Yao |
| 2005/0201751 A1 | 9/2005 | Yao |
| 2005/0265728 A1 | 12/2005 | Yao |
| 2006/0012764 A1 * | 1/2006 | Kawashima et al. .......... 355/53 |
| 2006/0023987 A1 | 2/2006 | Yao |
| 2006/0110090 A1 * | 5/2006 | Ellwood ................... 385/6 |
| 2006/0115199 A1 | 6/2006 | Yao |
| 2007/0223078 A1 | 9/2007 | Yao et al. |
| 2007/0297054 A1 | 12/2007 | Yao et al. |
| 2008/0030839 A1 | 2/2008 | Yao |
| 2008/0054160 A1 | 3/2008 | Yao |
| 2008/0138070 A1 | 6/2008 | Yan et al. |
| 2008/0159692 A1 | 7/2008 | Yao |

OTHER PUBLICATIONS

A.D. Kersey et al., "Polarisation-Insensitive Fiber Optic Michelson Interferometer", Mar. 1991, Electronics Letters, vol. 27, No. 6, pp. 518-519.*

Sobiski, D., et al., "Fast first-order PMD compensation with low insertion loss for 10Gbit/s system," *Electronics Letters*, 37(1):46-48, Jan. 2001.

Yan, L.S., et al., "Programmable Group-Delay Module using Binary Polarization Switching," *IEEE Journal of Lightwave Technology*, 21(7):1676-1684, Jul. 2003.

\* cited by examiner

FIG. 5

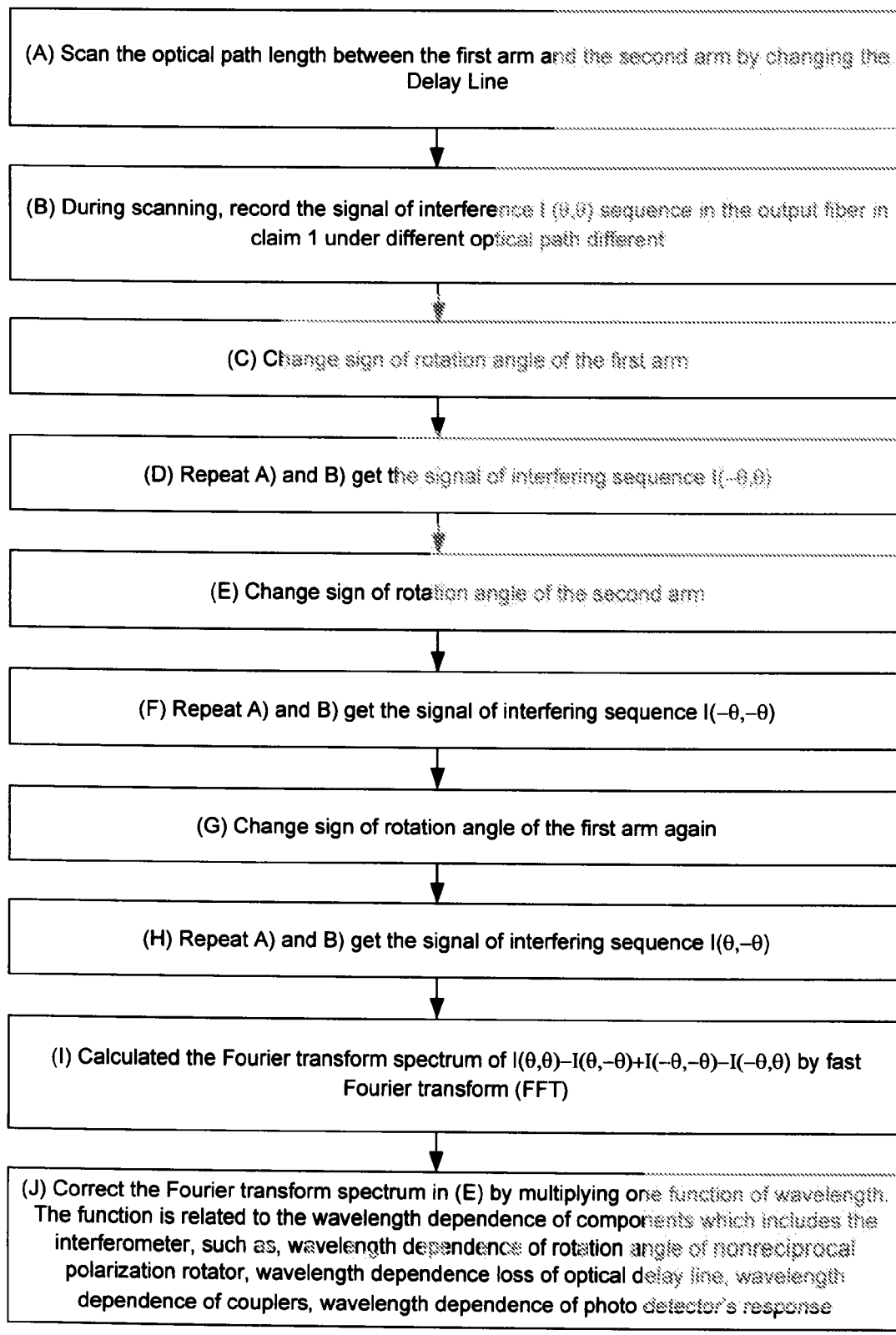

(A) Scan the optical path length between the first arm and the second arm by changing the Delay Line (B) During scanning, record the signal of interference I (θ,θ) sequence in the output fiber in claim 1 under different optical path different (C) Change sign of rotation angle of the first arm (D) Repeat A) and B) get the signal of interfering sequence I(-θ,θ)

(E) Change sign of rotation angle of the second arm (F) Repeat A) and B) get the signal of interfering sequence I(-θ,-θ)

(G) Change sign of rotation angle of the first arm again (H) Repeat A) and B) get the signal of interfering sequence I(θ,-θ)

(I) Calculated the Fourier transform spectrum of I(θ,θ)−I(θ,-θ)+I(-θ,-θ)−I(-θ,θ) by fast Fourier transform (FFT)

(J) Correct the Fourier transform spectrum in (E) by multiplying one function of wavelength. The function is related to the wavelength dependence of components which includes the interferometer, such as, wavelength dependence of rotation angle of nonreciprocal polarization rotator, wavelength dependence loss of optical delay line, wavelength dependence of couplers, wavelength dependence of photo detector's response

FIG. 6

(A) Change the optical path length between the first arm and the second arm by changing the Delay Line step by step

(B) At each scanning step:
- (B1) Record the signal of interference I(θ,θ) in the output fiber in claim 1 under different optical path different
- (B2) Change sign of rotation angle of the first arm
- (B3) Repeat (B1) and (B2) to get the signal of interfering sequence I(-θ,θ)
- (B4) Change sign of rotation angle of the second arm
- (B5) Repeat (B1) and (B2) to get the signal of interfering sequence I(-θ,-θ)
- (B6) Change sign of rotation angle of the first arm again
- (B7) Repeat (B1) and (B2) get the signal of interfering sequence I(θ,-θ)

(C) Calculated the Fourier transform spectrum of I(θ,θ)-I(θ,-θ)+I(-θ,-θ)-I(-θ,θ) by fast Fourier transform (FFT)

(D) Correct the Fourier transform spectrum in (E) by multiplying one function of wavelength. The function is related to the wavelength dependence of components which includes the interferometer, such as, wavelength dependence of rotation angle of nonreciprocal polarization rotator, wavelength dependence loss of optical delay line, wavelength dependence of couplers, wavelength dependence of photo detector's response

OPTICAL SPECTRUM ANALYSIS USING OPTICAL INTERFEROMETRY

This application claims the benefit of U.S. Provisional Patent Application No. 60/739,189 entitled "Broadband Spectrum Analysis Using Polarization Rotator and Fourier Transform" and filed on Nov. 23, 2005, the entire disclosure of which is incorporated herein by reference as part of the specification of this application.

BACKGROUND

This application relates to techniques and optical devices for optical spectrum analysis.

Optical spectrum analysis uses an optical device to process an optical signal and to extract spectral information from the optical signal. For example, such analysis can identify the frequencies or wavelengths of spectral components in the optical signal and signal levels of the spectral components. The result of such analysis is often represented in form of an optical power spectrum of the optical signal which is a measurement of optical power as a function of optical wavelength or frequency for the spectral components in the optical signal within the operating spectral range of the optical device used to process the optical signal.

Apparatus for performing optical spectrum analysis can be in various configurations and is sometime referred to as optical spectrum analyzers or optical spectrometers. Optical diffraction gratings, optical prisms, optical bandpass filters such as tunable Fabry-Perot filters, and optical interferometers such as Michelson interferometers are examples of optical devices that can be used to perform the optical processing of the optical signal in optical spectrum analysis.

SUMMARY

This application describes techniques and devices that use polarization rotation and optical interferometry to provide optical spectrum analysis of an optical signal. In one aspect, a device described in this application includes an optical input port to receive an optical input signal; an optical output port to output an optical output signal; an optical coupler which receives the optical input signal and splits the received optical input signal into a first optical input signal and a second optical input signal; a first optical path to receive the first optical input signal and to reflect the first optical input signal back to the optical coupler as a first reflected signal; and a second optical path to receive the second optical input signal and to reflect the first optical input signal back to the optical coupler as a second reflected signal. The first optical path comprises a first optical reflector which includes a first mirror and a first nonreciprocal polarization rotator to produce the first reflected signal. The second optical path comprises a second optical reflector which includes a second mirror and a second nonreciprocal polarization rotator to produce the second reflected signal. The optical coupler receives and mixes the first and the second reflected signals to produce an interference signal as the optical output signal. This device further includes a control unit to control a relative optical path difference between the first and the second optical paths; an optical detector to receive the output optical signal and to convert the received optical output signal into an electronic signal; and a processing unit that applies a Fast Fourier Transform to the electronic signal to extract spectral information from the optical output signal to obtain spectral information of the optical input signal.

A method for operating the above device is also described to operate the control unit to scan the relative optical path difference between the first and the second optical paths; control the first and the second polarization rotators to produce a positive rotation angle in polarization of light in both the first and the second polarization rotators to obtain a first measurement of the electronic signal from the optical detector; control (1) the first polarization rotator to produce the positive rotation angle in polarization of light and (2) the second polarization rotator to produce a negative rotation angle in polarization of light that is equal in magnitude to the positive rotation angle and is opposite in direction of rotation to obtain a second measurement of the electronic signal from the optical detector; control the first and the second polarization rotators to produce the negative rotation angle in polarization of light in both the first and the second polarization rotators to obtain a third measurement of the electronic signal from the optical detector; control (1) the first polarization rotator to produce the negative rotation angle in polarization of light and (2) the second polarization rotator to produce the positive rotation angle in polarization of light to obtain a fourth measurement of the electronic signal from the optical detector; and operate the processing unit to produce a combination measurement signal that is equal to a difference between (1) a sum of the first and third measurements and (2) a sum of the second and the fourth measurements and to process the combination measurement signal in extracting the spectral information of the optical input signal.

Particular embodiments of the invention can be implemented to realize one or more of advantages. For example, the device can be configured and operated to provide polarization insensitive measurements. As another example, the device can be configured and operated in a manner that reduces the effect of optical power variations on the measurement.

The details of one or more embodiments of the invention are set forth in the accompanying drawings and the description below. Other features, aspects, and advantages of the invention will become apparent from the description, the drawings, and the claims.

BRIEF DESCRIPTION OF DRAWINGS

FIG. 5 shows one example operation flow in operating the device in FIG. 3.

FIG. 6 shows another example operation flow in operating the device in FIG. 3.

Like reference numbers and designations in the various drawings indicate like elements.

DETAILED DESCRIPTION

This application describes techniques and devices which provide a Fourier transform spectral analysis using an optical interferometer. For example, the optical interferometer may be implemented as, among others, a fiber Michelson interferometer. Other interferometers may also be used. A nonreciprocal polarization rotator and associated data processing are implemented in the described examples to allow for spectral analysis in a broad band beyond the bandwidth of some other spectrum analyzers. For example, spectrum analyzers described in this application may be configured to have a bandwidth of several hundred nanometers. Various implementation of the techniques and devices for spectrum analysis in this application may be used to mitigate one or more of technical limitations in some other spectrum analysis devices, including (i) polarization dependence which can degrade the device performance; (ii) low accuracy; and (iii) a relatively narrow bandwidth.

Figure 1:
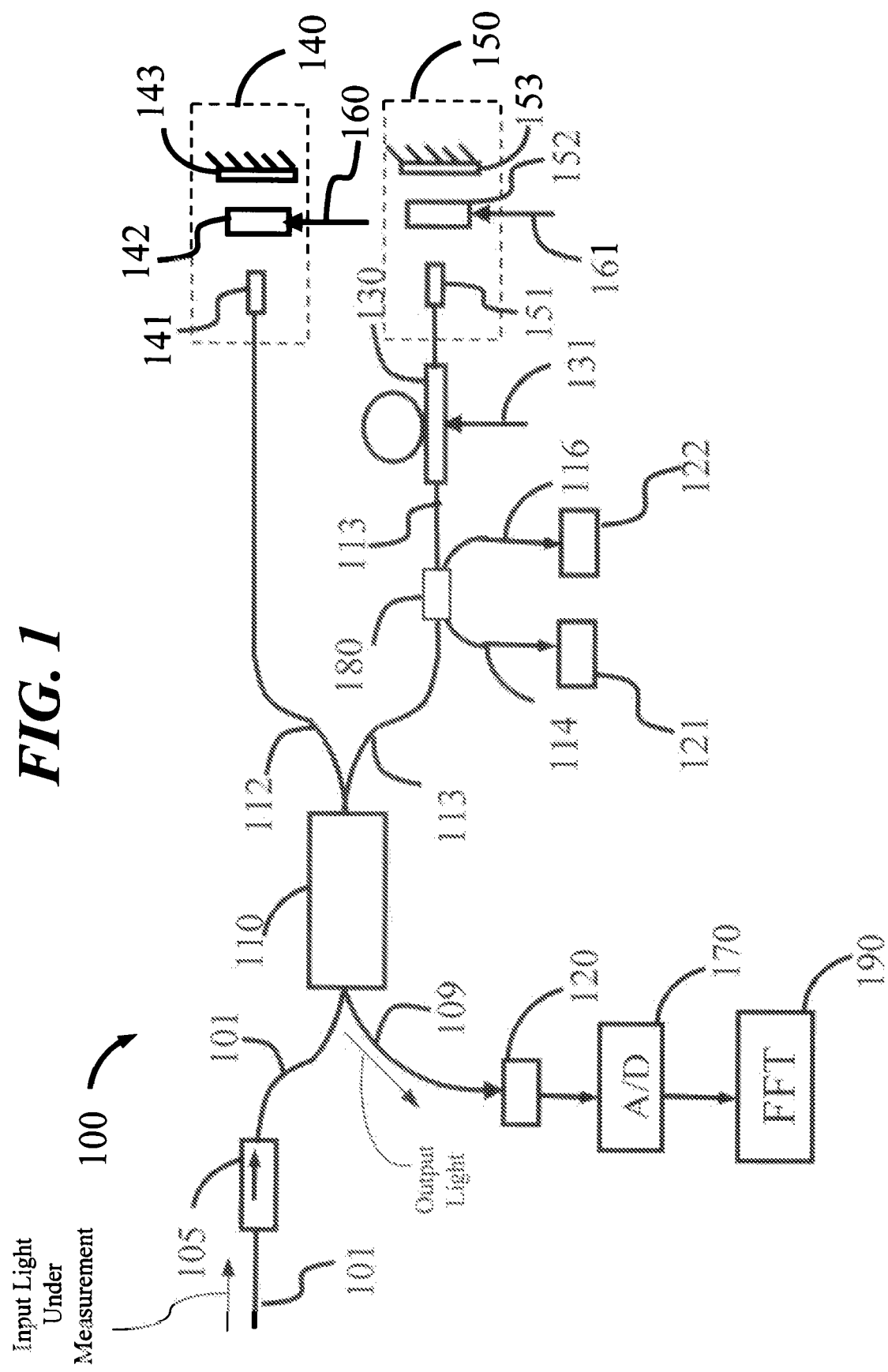
FIG. 1 shows a exemplary design of a broadband interferometer/spectrometer.

As one specific example, FIG. 1 shows a fiber-based interferometer or spectrometer 100 based on a Michaelson interferometer mechanism. The device 100 uses an input fiber 101 to receive input light under measurement. A fiber coupler 110, such as a 50/50 coupler, is coupled to the input fiber 101 and an output fiber 109 on one end and also coupled to fibers 112 and 113 on the other end. Hence, the input light in the fiber 101 is split into two beams in fiber 112 and fiber 113, respectively. The split light beams in fiber 112 and fiber 113 propagate in different optical paths in fiber 112 and fiber 113 and are reflected back by two optical reflectors 140 and 150 at the end of fiber 112 and fiber 113, respectively. The optical reflectors 140 and 150 can be identical or similar to each other. The reflected light beams in fiber 112 and fiber 113 are directed into the coupler 110 and are mixed by the coupler 110. One portion of the mixed light in the coupler 110 is, by coupling of the coupler 110, sent out to the output fiber 109 as the output light for detection and signal processing. The remaining portion of the mixed light in the coupler 110 is sent out to the input fiber 101. When the difference in the optical path lengths of the reflected beams in fiber 112 and fiber 113 is within the coherent length of the original input light in the fiber 101, the reflected beams in fiber 112 and 113 optically interfere with each other when mixed in the coupler 110. The output light in the output fiber 109 has the interference information. As illustrated, an optical isolator 104 may be coupled in the fiber 101 to eliminate the optical feedback from the coupler 110 to the input fiber 101.

At least one of the fiber 112 and fiber 113, such as fiber 113, may be engaged to a fiber control device 130 to adjust the relative difference of the optical path lengths of the fiber 112 and fiber 113 to get the interference information in the output light in the output fiber 109 under different relative difference of the optical path lengths of the fiber 112 and fiber 113. The fiber control device 130 can be a fiber stretcher or a tunable optical delay device that changes the optical path length of the fiber 113 in response to a control signal 131. The tuning of the optical path length by the fiber control device 130 thus provides a wavelength scanning mechanism for the spectrum analysis. Alternatively, the optical path lengths of both fiber 112 and fiber 113 can be controlled and tuned to adjust the difference between the optical path lengths of fiber 112 and fiber 113 in some implementations.

An optical detector 120, such as a photodiode, is coupled to the output fiber 109 to receive the output light to produce a detector output for the spectrum analysis. An analog-to-digital converter (ADC) 170 can be used to convert the detector output in the analog form from the optical detector 120 into a digital signal to be further processed. A fast Fourier transform (FFT) device 190, which may include a microprocessor, is coupled to the ADC 170 to process the digitized detector output and to produce the spectral information of the input light in the fiber 101.

Each of the reflectors 140 and 150 can be configured as a Faraday reflector. In the example shown in FIG. 1, the reflector 140 includes a fiber collimator 141, a nonreciprocal polarization rotator 142 and a mirror 143. The reflector 150 can be similarly constructed and, in the illustrated example, includes a fiber collimator 151, a nonreciprocal polarization rotator 152 and a mirror 153. A Faraday polarization rotator is one example for a nonreciprocal polarization rotator which operates to rotate the polarization of light independent of the direction of propagation. Such a Faraday polarization rotator produces a non-reciprocal polarization rotation by the magneto-optical effect caused by a magnetic field applied along the propagation direction of light. Other nonreciprocal polarization rotators may also be used. The rotation angle of Faraday polarization rotators 142 and 143 can be designed to be 45 degrees at the center wavelength of the device 100. Hence, each reflected beam in each of the fiber 112 and fiber 113 undergoes a total rotation of 90 degrees in polarization after passing through the Faraday rotator 142 or 152 twice due to the reflection by the mirror 143 or 153. At the center wavelength, the fiber 112 and fiber 113 receive the reflected light beams with the same polarization states which are reflected back by reflectors 140 and 150. As such, the device 100 is insensitive to polarization variations which can be caused by various factors, such as the polarization variation of the light received by input fiber 101 and the polarization variation caused by fiber 112 and fiber 113 and other components in the interferometer 100. If the rotation angles of Faraday rotator 142 and 152 deviate from the preset value of 45 degrees, the device 100 is sensitive to polarization variations.

The above configuration of the Faraday rotator, can be used reduce the polarization dependence of the device 100 even when the rotation angle of each Faraday rotator deviates from the 45-degree angle. This feature can be implemented as follows.

The nonreciprocal polarization rotators 142 and 152 can be tunable polarization rotators that produce a tunable rotation angle in polarization in response to a control signal 160 or 161. The control signals 160 and 161 are used to control the Faraday polarization rotator 142 and 152, respectively. Hence, the signs or directions of their rotation angles of polarization rotator 142 and 152 are changeable. For example, the rotation angle of Faraday polarization rotators 141 and 152 may change from a positive angle in one direction to a negative angle in an opposite direction, or vice versa. This change of the direction or sign of the rotation angle can be achieved by, reversing the direction of the magnetic field in Faraday polarization rotator 142 or 152 without changing the magnitude of the magnetic field.

Assume the positive rotation angle of Faraday polarization rotators 142 and 152 is θ, and the negative rotation angle of 142 and 152 is −θ. Faraday polarization rotators 142 and 152 can be used to produce four different states for the combined operation of the two rotators 142 and 152:

(θ,θ),
(θ,−θ),
(−θ,−θ), and
(−θ,θ), where x in (x, y) represents the polarization rotation angle produced by the rotator 142 and y) represents the polarization rotation angle produced by the rotator 152. These four polarization states in turn generate four different light interference intensities in output fiber 109 under the same relative difference of the optical path lengths of the fiber 112 and 113. We represent the four light intensity levels in output fiber 109 as I(θ,θ), I(θ,−θ), I(−θ,−θ), I(−θ,θ), then the following combination intensity of

I(θ,θ)+I(−θ,−θ)−I(θ,−θ)−I(−θ,θ)

is insensitive to polarization variations although the rotation angle θ of Faraday polarization rotators 142 and 152 can be different from 45 degrees. Therefore, in operating the device 100 in FIG. 1, the above four different outputs are measured and the combination intensity value is used to perform the spectrum analysis to eliminate any errors in the measurement caused by polarization variations.

In addition to the polarization variation, power variations may also adversely affect the accuracy of the spectrum analysis. Hence, in some implementations, the device 100 can include a power calibration mechanism to account for any variation in the input power 101 and the insertion loss variation of the device 130 which is a tunable optical delay device or a fiber stretcher during the measurement. This power calibration mechanism can reduce or minimize errors in the spectrum analysis caused by power variations.

FIG. 1 shows one example of this power calibration mechanism which uses a fiber coupler 180 in the fiber 113 to split a fraction of input light in fiber 113 into an optical detector 122 that monitors the variation of the input power of device 100 and a fraction of light in fiber 113 reflected back from reflector 150 into an optical detector 121 that monitors the variation of the insertion loss of device 130. The detector outputs of the detector 121 and detector 122 are used to monitor the power variations. In operation, the detector outputs are fed to the FFT device 190 for calibrating the effects caused by the input power variation and insertion loss variation of device 130. Alternatively, the detector outputs can be fed into a processing device that performs the power calibration on the output from the FFT device 190 to calibrate the effects caused by the input power variation and insertion loss variation of device 130.

The following sections describe one simplified analytical method for processing measured data from the device 100 in FIG. 1 to obtain the spectrum analysis. This method can be used to achieve broadband and polarization independent interference in the device 100. For simplicity, it is assumed that the input beam of the fiber 101 may be written as $$E = \begin{bmatrix} E_x \\ E_y \end{bmatrix}. \quad (1)$$

Jones matrix of coupler 110 from fiber 101 to fiber 112, from fiber 112 to fiber 101, fiber 113 to fiber 109 may be written as $$K_{112 \leftarrow 101} = K_{101 \leftarrow 112} = K_{109 \leftarrow 113} = \sqrt{1-k1} \begin{bmatrix} 1 & 0 \\ 0 & 1 \end{bmatrix} \quad (2)$$

where k1 is related the splitting ratio of the coupler 110. Jones matrix of coupler 110 from fiber 101 to fiber 113, from fiber 112 to fiber 109 may be written as $$K_{113 \leftarrow 101} = K_{109 \leftarrow 112} = i\sqrt{k_1} \begin{bmatrix} 1 & 0 \\ 0 & 1 \end{bmatrix} \quad (3)$$

The Jones matrix of the fiber 112 between coupler 110 and reflector 140 may be written as $$F_{140 \leftarrow 112} = \exp(i\beta l_{112 \leftrightarrow 140}) \begin{bmatrix} a_1 & b_1 \\ -b_1^* & a_1^* \end{bmatrix} \quad (4)$$

where $a_1 a_1^* + b_1 b_1^* = 1$, and $$F_{112 \leftarrow 140} = \exp(i\beta l_{112 \leftrightarrow 140}) \begin{bmatrix} a_1 & b_2^* \\ -b_1 & a_1^* \end{bmatrix} \quad (5)$$

where wave vector $\beta = 2n_{fiber} \pi / \lambda_{vacuum}$.

The Jones matrix of fiber between fiber 113 between coupler 110 and reflector 150 including delay line 130 may be written as $$F_{150 \leftarrow 113} = \exp(i\beta l_{113 \leftrightarrow 150}) \begin{bmatrix} a_2 & b_2 \\ -b_2^* & a_2^* \end{bmatrix} \text{ where } a_2 a_2^* + b_2 b_2^* = 1 \quad (6)$$

$$F_{113 \leftarrow 150} = \exp(i\beta l_{113 \leftrightarrow 150}) \begin{bmatrix} a_2 & b_2^* \\ -b_2 & a_2^* \end{bmatrix} \text{ where } a_2 a_2^* + b_2 b_2^* = 1 \quad (7)$$

In addition, the matrix of reflector of 140 and 150 may be written as $$R_{140} = R_{150} \begin{bmatrix} \cos 2\theta & -\sin 2\theta \\ -\sin 2\theta & -\cos 2\theta \end{bmatrix} \quad (8)$$

From formulae (1) to (8), the following expressions can be derived. First, the electric field of light in output fiber 109 reflected back from reflector 140 can be written as $$E_{109 \leftarrow 112}(\theta, \theta) = K_{109 \leftarrow 112} F_{112 \leftarrow 140} R_{140} F_{140 \leftarrow 112} K_{112 \leftarrow 101} E = \quad (9)$$
$$i\sqrt{k_1(1-k_1)} \exp(i2\beta l_{112 \leftrightarrow 140})$$
$$\left( \sin 2\theta_1 \begin{bmatrix} 0 & -1 \\ -1 & 0 \end{bmatrix} + \cos 2\theta_1 \begin{bmatrix} c_1 & d_1 \\ d_1^* & -c_1^* \end{bmatrix} \right) \begin{bmatrix} E_x \\ E_y \end{bmatrix}$$

where $c_1 = a_1 a_1 + b_1^* b_1^* \quad d_1 = a_1 b_1 - a_1^* b_1^* \quad (10)$ The electric field of light in output fiber 109 reflected back from reflector 150 can be written as $$E_{109 \leftarrow 113}(\theta, \theta) = K_{109 \leftarrow 113} F_{113 \leftarrow 150} R_{150} F_{150 \leftarrow 113} K_{113 \leftarrow 101} E = \quad (11)$$
$$i\sqrt{k_1(1-k_1)} \exp(i2\beta l_{113 \leftrightarrow 150})$$
$$\left( \sin 2\theta_1 \begin{bmatrix} 0 & -1 \\ -1 & 0 \end{bmatrix} + \cos 2\theta_1 \begin{bmatrix} c_2 & d_2 \\ d_2^* & -c_2^* \end{bmatrix} \right) \begin{bmatrix} E_x \\ E_y \end{bmatrix}$$

where $c_2 = a_2 a_2 + b_2^* b_2^* \quad d_2 \, a_2 b_2 - a_2^* b_2^*$

The corresponding light power in output fiber 109 is $$I(\theta,\theta)=(E_{109\leftarrow112}(\theta,\theta)+E_{109\leftarrow113}(\theta,\theta))^T(E_{109\leftarrow112}(\theta,\theta)+E_{109\leftarrow113}(\theta,\theta)) \quad (12)$$

Using the above results, the combination power parameter can be written as the following:

$$I(x)=I(\theta,\theta)+I(-\theta,-\theta)-I(\theta,-\theta)-I(-\theta,\theta)$$

$$=8k(1-k)\sin^2(2\theta)\cos(2\beta(1_{113}\leftrightarrow 1_{150}-1_{112}\leftrightarrow 1_{140}))I_{in}(\lambda)$$

$$=8k(1-k)\sin^2(2\theta)\cos(2\beta x)I_{in}(\lambda)$$

$$=m(v)\sin^2(2\theta)\cos(2\pi v x)I_{in}(v) \quad (13)$$

where $$v=\frac{1}{\lambda}.$$

The expression (13) represents the interference information between the light beams in the two fiber arms 112 and 113. Notably, this interference signal does not include the parameters related to the polarization states of light in the components and fibers of device 100. Therefore, this interference signal is independent of polarization states of light and provides a polarization-insensitive spectrum analysis.

In some practical applications, the input light may include multiple wavelengths or multiple spectral components. Therefore, the interferogram (13) becomes:

$$1(x)=\int_0^\infty P(v)m(v)\sin^2(2\theta)\cos(2\pi vx)dv = \quad (14)$$

$$\int_0^\infty \frac{1}{2}P(v)m(v)\sin^2(2\theta)(\exp(i2\pi vx)+\exp(i2\pi vx))dv$$

$$=\int_0^\infty \frac{1}{2}P(v)m(v)\sin^2(2\theta)(\exp(i2\pi vx)+\exp(i2\pi vx))dv \quad (15)$$

The following notations are defines:

$$P(v)=P(-v) \quad m(v)=m(-v), \quad g(v)=\frac{1}{2}P(v)m(v)\sin^2(2\theta) \quad (16)$$

The interference signal in (15) can be rewritten as $$1(x)=\int_{-\infty}^{+\infty} g(v)\exp(i2\pi vx)dv \quad (17)$$

According to Fourier transform theory, the g (v) can be calculated from the Fourier transform of I(x):

$$g(v)=\int_{-\infty}^{+\infty} I(x)\exp(-i2\pi vx)dx = F\{I(x)\} \quad (18)$$

where we call F { } as Fourier transform. From the measured interferogram, the spectrum of input light P (v) can obtained from (16) and (18)

$$P(v)=\frac{2|g(v)|}{\sin^2(2\theta_v)m(v)} \quad (19)$$

Figure 2:
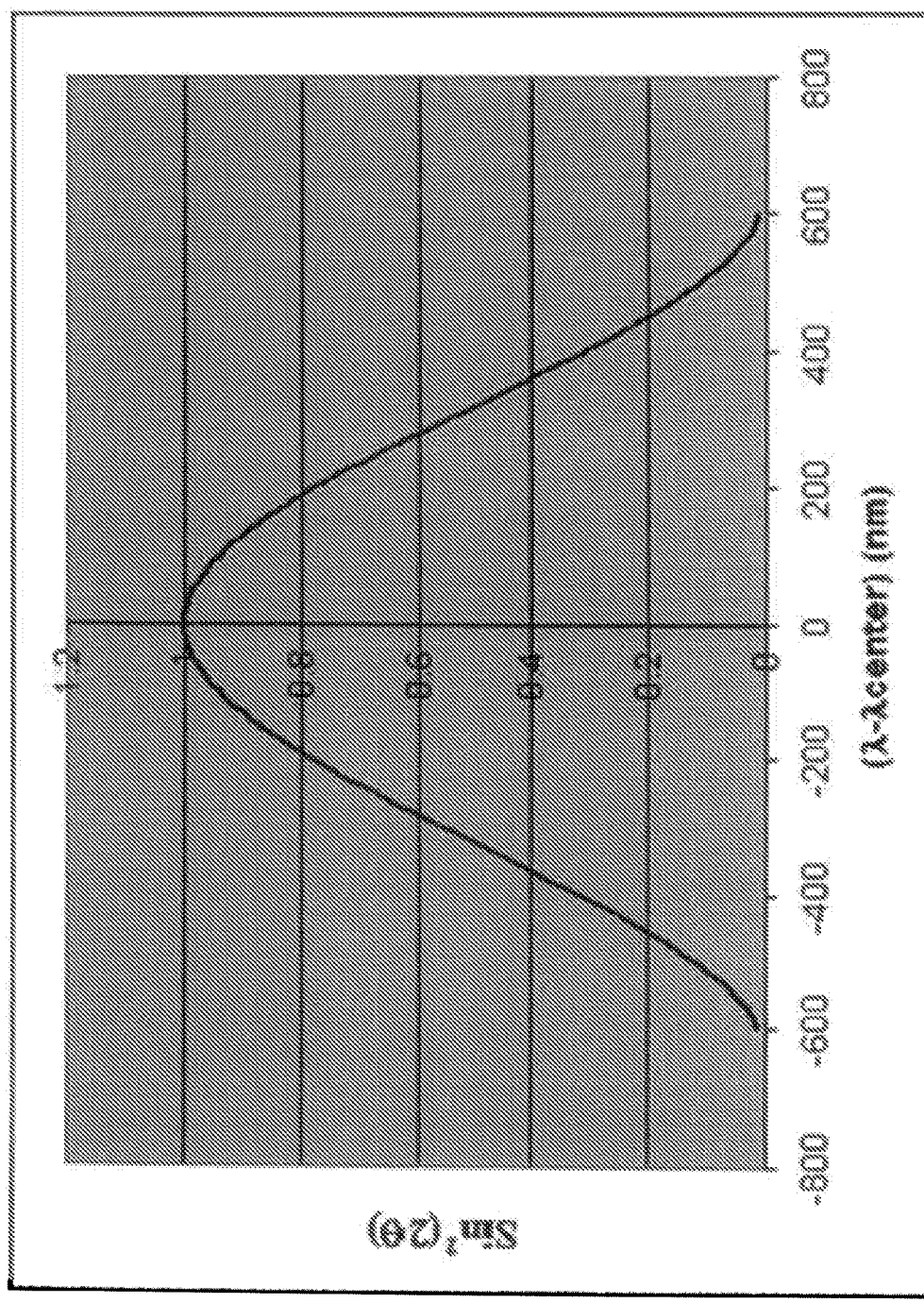
FIG. 2 shows an example of the wavelength dependence of the polarization rotation angle of a Faraday rotator used in FIG. 1 where the vertical axis is $Sin^2(2\theta)$ for the rotation angle $\theta$ and the horizontal axis is the difference of the optical wavelength ($\lambda$) of the input light and the center wavelength ($\lambda center$) of the device in FIG. 1.

The rotation angle θ of Faraday rotator is wavelength dependent, so $\sin^2(2\theta)$ in (19) can limit the bandwidth of the measurement in the device 100 in FIG. 1. If the bandwidth of $\sin^2(2\theta)$ is defined by using FWHM (full width at half maximum), the bandwidth of the device 100 in FIG. 1 is about 600 nm when dθ/dλ is equal to 0.07°/nm. FIG. 2 shows an example of the wavelength dependence of the polarization rotation angle of a Faraday rotator used in FIG. 1 where the vertical axis is $\sin^2(2\theta)$ for the rotation angle θ and the horizontal axis is the difference of the optical wavelength (λ) of the input light and the center wavelength (λcenter) of the device 100.

Figure 3:
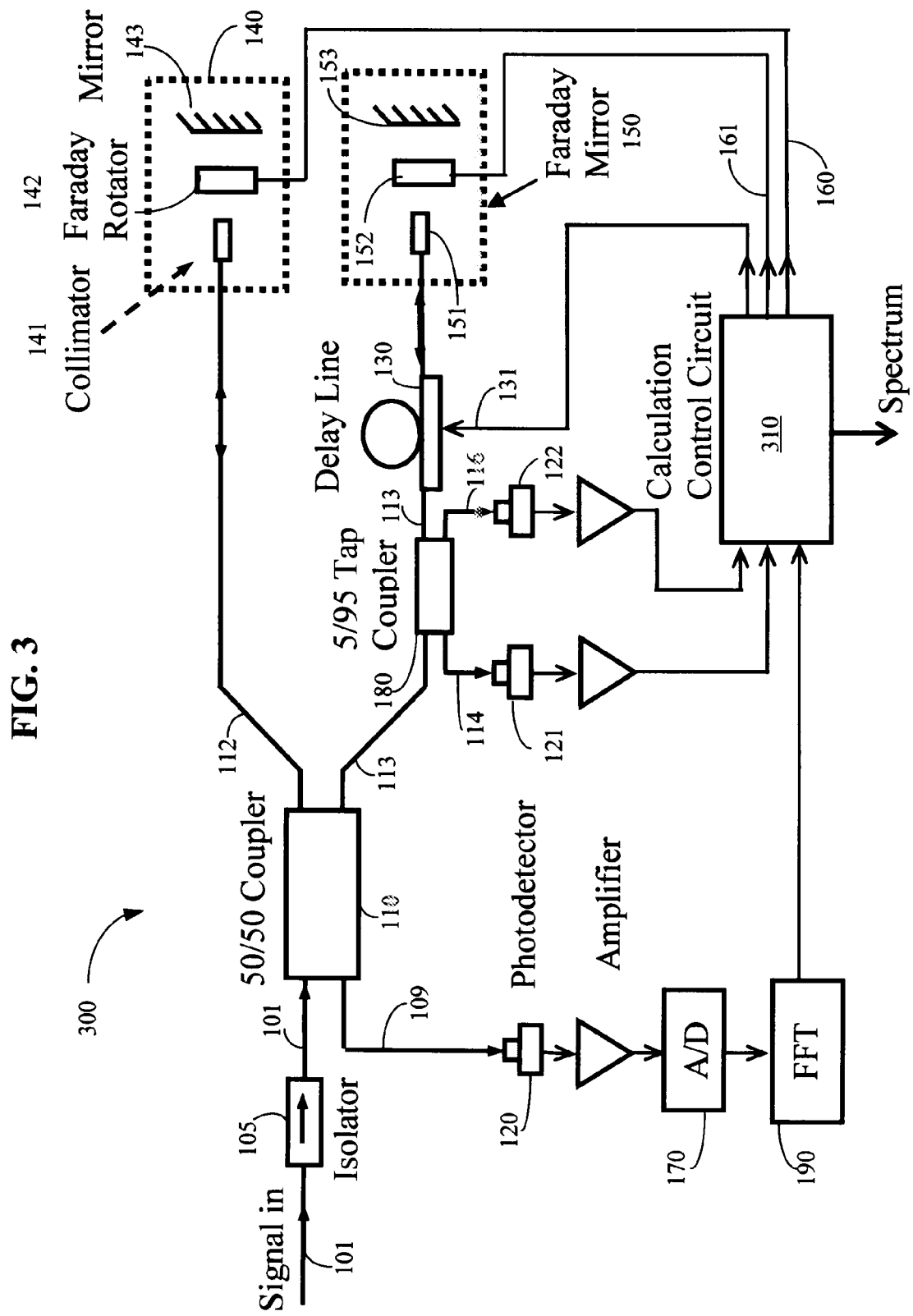
FIG. 3 illustrates an exemplary implementation of a interferometer/spectrometer based on the design in FIG. 1.

FIG. 3 illuminates an implementation of a broadband spectral analyzer 300 based on the design in FIG. 1 and data processing method described above. An electric control circuit 310 is implemented to provide control functions and signal processing. The circuit 310 is connected to receive the detector output signals from detectors 120, 121 and 120, and the output from the FFT 190. The circuit 310 is designed to generate the control signal 160, 161 for changing the rotation states of Faraday polarization rotators 142 and 153, and the control signal 131 for tuning the relative optical path delay between the fiber 112 and fiber 113. During turning of the relative delay, FFT device 190 receives four sequences of interference data I(θ, θ) I(−θ, −θ), I(θ, −θ) and I(−θ, θ) from the detector 120 under the four different polarization rotations produced by controlled Faraday polarization rotators 142 and 152. The FFT device 190 performs the Fourier transform of the received signal for the combination power parameter of I(θ, θ)+I(−θ, −θ)−I(θ, −θ)−I(−θ, θ) to produce the spectrum of the input light.

The examples in FIGS. 1 and 3 can be used to construct an optical fiber-based spectrometer that includes an input port to receive input light such as the input fiber 101 and an input/output coupler 110 to receive light from input light and split input light into two light beams and two fiber arms 112 and 113 that receive the two light beams split from the input light. Each of the two fiber arms includes optical fiber, a collimator, a nonreciprocal polarization rotator and a mirror. At least one delay line is used in the two fiber arms. Photodetectors are provided to detect the interference signal and the light power in fibers to monitor power fluctuation during measurement. In some implementations, the input/output coupler may include a first port which couples to input fiber and output fiber and a second port which couples to the first fiber arm and the second fiber arm. The tested light is input from input fiber and is directed to and split at the second port. Various 4-port fiber couplers can be used as this input/output coupler. In some implementations, the collimator, the nonreciprocal polarization rotator and the mirror in each fiber arm may be separated components and in other implementations, these components can be assembled as one package as a switchable Faraday mirror.

Figure 4A:
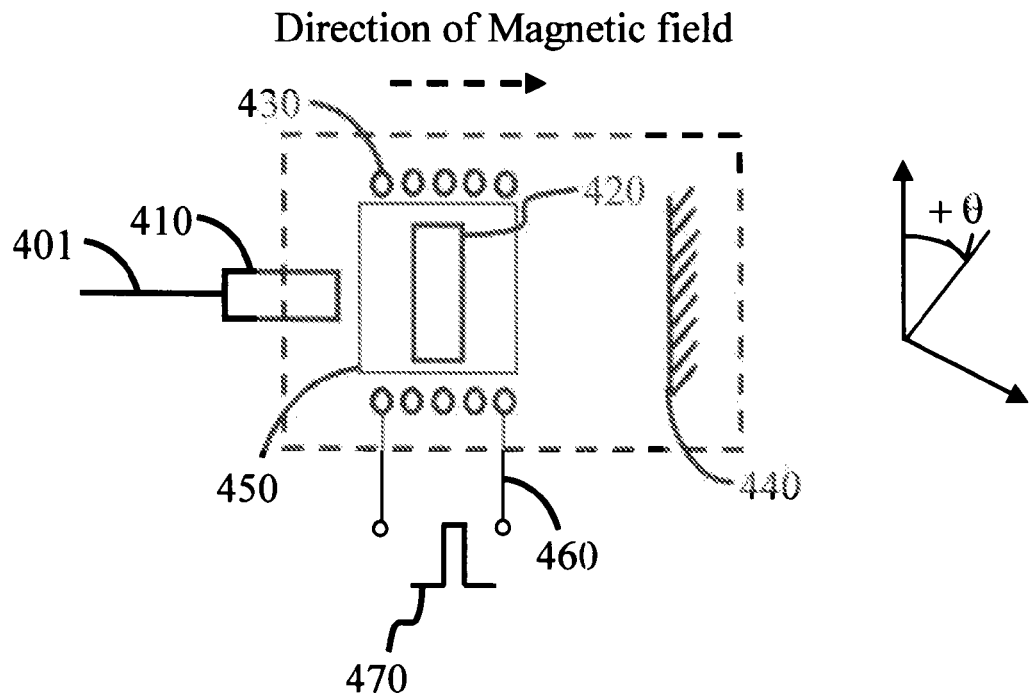
FIGS. 4a and 4b show, respectively, two operation modes of a Faraday rotator used in an optical reflector in FIG. 3 that produces a positive rotation angle and a negative rotation angle.
Figure 4B:
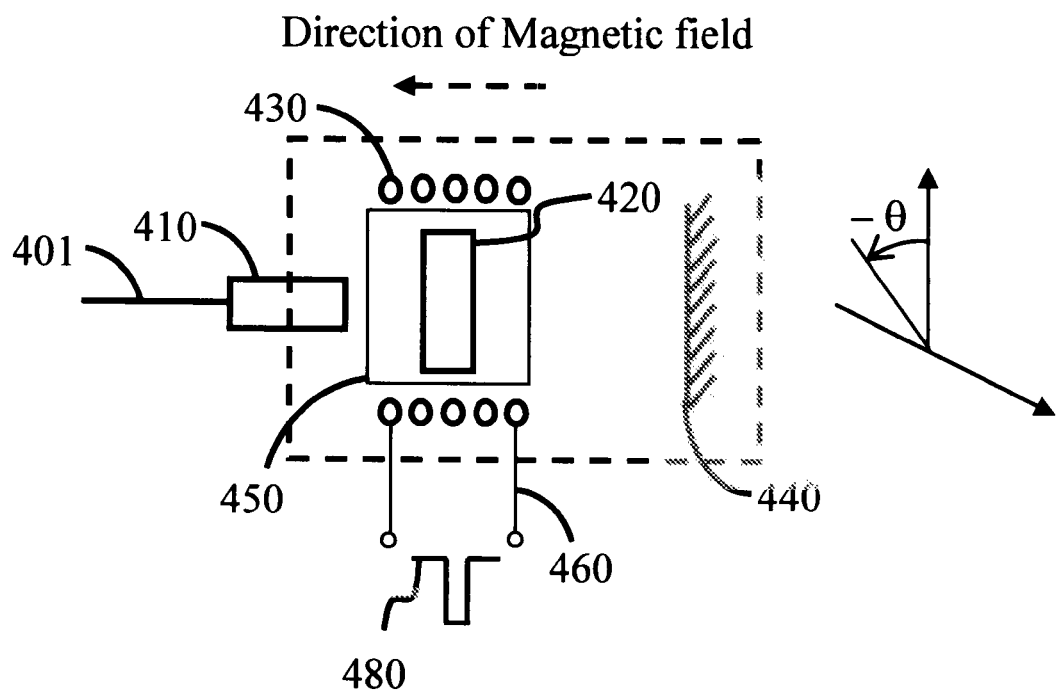

FIGS. 4*a* and 4*b* show, respectively, two operation modes of an exemplary switchable Faraday rotator mirror for implementing an optical reflector in FIG. 3 that produces a positive rotation angle and a negative rotation angle. This particular Faraday rotator mirror includes (a) an input/output fiber 401 receiving input light and outputting the reflected light, which is coupled to fiber 112 or 113 in FIGS. 1 and 3; (b) a collimator 410 converting light in input fiber 401 into a collimated and parallel beam in free space and coupling the light reflected from mirror 440 into the input/output fiber 401; (c) a conductor coil 430 supporting an electrical current and generating a magnetic field to control the direction of the Faraday polarization rotation and the rotation angle; (d) a Faraday rotator 420 surrounded by the coil 430 to produce the Faraday polarization rotation; and (e) a mirror 440 reflecting back the light from collimator 410 back to collimator 410 through the Faraday rotator 420. The Faraday rotator 420 is made from an optical material that exhibits the magneto-optic effect that causes the Faraday rotation.

In operation, a positive signal 470 in FIG. 4a is applied to the coil 430 to control the direction of the magnetic field in the Faraday rotator 420 to along a first positive direction and this magnetic field causes the Faraday rotator 420 to produce a positive rotation angle. FIG. 4b shows a negative signal 480 is applied to the coil 430 to control the direction of the magnetic field in Faraday rotator 420 to be opposite to what is in FIG. 4a, e.g., in a negative direction to produce a negative rotation angle.

As an option, the switchable Faraday rotator mirror in FIGS. 4a and 4b can include a permanent magnetic cylinder 450 with a low reverse field between the coil 430 and the Faraday rotator 420 to maintain a magnetic field in the Faraday polarization rotator 420 without the controlling signal 470 or 480. A continuous control signal 470 or 480 may be applied on the coil 420 without the optional permanent magnetic cylinder 430.

FIG. 5 shows one example of a measuring and calculating method in operating the devices in FIGS. 1 and 3. The following operations can be performed:

(A) Scan the optical path length difference between the first arm 112 and the second arm 113 by changing the Delay Line 130.

(B) During scanning, record the signal of interference I(θ,θ) sequence in the output fiber 109 under the different optical path differences when both rotators 142 and 152 are set to the positive rotations.

(C) Change sign of rotation angle of the rotator 142 in the first arm 112.

(D) Repeat operations (A) and (B) to obtain the signal of interfering sequence I(−θ,θ).

(E) Change sign of rotation angle of the rotator 152 in the second arm 113.

(F) Repeat operations (A) and B) to obtain the signal of interfering sequence I(−θ,−θ).

(G) Change sign of rotation angle of the rotator 142 in the first arm 112 to the negative angle.

(H) Repeat operations (A) and B) get the signal of interfering sequence I(θ,−θ).

(I) Calculate the Fourier transform spectrum of I(θ,θ)−I(θ,−θ)+I(−θ,−θ)−I(−θ,θ) by fast Fourier transform (FFT).

(J) Correct the Fourier transform spectrum in (E) by multiplying one function of wavelength. The function is related to the wavelength dependence of components which includes the interferometer, such as, wavelength dependence of rotation angle of nonreciprocal polarization rotator, wavelength dependence loss of optical delay line, wavelength dependence of couplers, wavelength dependence of photo detector's response.

In FIG. 5, the sequence of obtaining the four different interference signals for different polarization rotation states can be performed in a sequence different from what is described above.

FIG. 6 shows another example of a measuring and calculating method for operating the devices in FIGS. 1 and 3. The following operations can be performed:

(A) Change the optical path length difference between the first arm 112 and the second arm 113 by changing the Delay Line 130 step by step.

(B) At each scanning step (B1) Record the signal of interference I(θ,θ) in the output fiber 109 under different optical path differences when both rotators are set to positive rotation angles.

(B2) Change sign of rotation angle of the rotator 142 in the first arm 112 to the negative rotation angle.

(B3) Repeat (B1) and (B2) to get the signal of interfering sequence I(−θ,θ).

(B4) Change sign of rotation angle of the rotator 152 in the second arm 113 to the negative rotation angle.

(B5) Repeat (B1) and (B2) to get the signal of interfering sequence I(−θ,−θ).

(B6) Change sign of rotation angle of the rotator 142 in the first arm 112 to the positive rotation angle.

(B7) Repeat (B1) and (B2) get the signal of interfering sequence I(θ,−θ).

(C) Calculate the Fourier transform spectrum of I(θ,θ)−I(θ,−θ)+I(−θ,−θ)−I(−θ,θ) by fast Fourier transform (FFT).

(D) Correct the Fourier transform spectrum in (E) by multiplying one function of wavelength. The function is related to the wavelength dependence of components which includes the interferometer, such as, wavelength dependence of rotation angle of nonreciprocal polarization rotator, wavelength dependence loss of optical delay line, wavelength dependence of couplers, wavelength dependence of photo detector's response.

In FIG. 6, the sequence of obtaining the four different interference signals for different polarization rotation states can be performed in a sequence different from what is described above.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments have been described. Other embodiments are within the scope of the following claims.

What is claimed is:

1. A method for operating the an optical spectrum analyzer which comprises: an optical input port to receive an optical input signal; an optical output port to output an optical output signal; an optical coupler which receives the optical input signal and splits the received optical input signal into a first optical input signal and a second optical input signal; a first optical path to receive the first optical input signal and to reflect the first optical input signal back to the optical coupler as a first reflected signal, wherein the first optical path comprises a first optical reflector which includes a first mirror and a first nonreciprocal polarization rotator to produce the first reflected signal; a second optical path to receive the second optical input signal and to reflect the first optical input signal back to the optical coupler as a second reflected signal wherein the second optical path comprises a second optical reflector which includes a second mirror and a second nonreciprocal polarization rotator to produce the second reflected signal wherein the optical coupler receives and mixes the first and the second reflected signals to produce an interference signal as the optical output signal; a control unit to control a relative optical path difference between the first and the second optical paths; an optical detector to receive the output optical signal and to convert the received optical output signal into an electronic signal; and a processing unit that applies a Fast Fourier Transform to the electronic signal to extract spectral information from the optical output signal to obtain spectral information of the optical input signal the method comprising:

operating the control unit to scan the relative optical path difference between the first and the second optical paths;

controlling the first and the second polarization rotators to produce a positive rotation angle in polarization of light in both the first and the second polarization rotators to obtain a first measurement of the electronic signal from the optical detector;

controlling (1) the first polarization rotator to produce the positive rotation angle in polarization of light and (2) the second polarization rotator to produce a negative rotation angle in polarization of light that is equal in magnitude to the positive rotation angle and is opposite in direction of rotation to obtain a second measurement of the electronic signal from the optical detector;

controlling the first and the second polarization rotators to produce the negative rotation angle in polarization of light in both the first and the second polarization rotators to obtain a third measurement of the electronic signal from the optical detector;

controlling (1) the first polarization rotator to produce the negative rotation angle in polarization of light and (2) the second polarization rotator to produce the positive rotation angle in polarization of light to obtain a fourth measurement of the electronic signal from the optical detector; and operating the processing unit to produce a combination measurement signal that is equal to a difference between (1) a sum of the first and third measurements and (2) a sum of the second and the fourth measurements and to process the combination measurement signal in extracting the spectral information of the optical input signal.

2. The method as in claim 1, further comprising:

calibrating the electronic signal from the detector to account for a power variation in the device.

3. The method as in claim 1, further comprising performing a fast Fourier Transform (FFT) on the combination measurement signal in extracting the spectral information of the optical input signal.

4. The method as in claim 1, comprising using a Faraday rotator to implement each of the first and second nonreciprocal polarization rotators.

5. The method as in claim 4, wherein the Faraday rotator comprises an optical material that exhibits an magneto-optic effect and a conductor coil surrounding the optical material.

6. The method as in claim 4, wherein the Faraday rotator further comprises a permanent magnetic cylinder placed between the optical material and the conductor coil.

7. The method as in claim 1, comprising using a fiber stretcher in the control unit to control the relative optical path difference.

8. The method as in claim 1, comprising using an optical delay line as part of the control unit to control the relative optical path difference.

9. The method as in claim 1, further comprising:

using an optical coupler in one of the first and second optical paths to split a fraction of light in two directions to produce two optical monitor signals; and using first and second optical detectors to covert the two optical monitor signals into two detector signals; and operating the processing unit to receive the two detector signals and processes the two detector signals to calibrate a power variation in light in the first and second optical paths in extracting the spectral information.

10. The method as in claim 1, wherein the optical input port is a first fiber, the optical output port is a second fiber, the first optical path is a third fiber and the second optical path is a fourth fiber; and wherein the optical coupler is a fiber coupler that is coupled to the first, the second, the third and the fourth fibers.

11. The method as in claim 1, comprising:

operating the processing unit to perform a fast Fourier Transform (FFT) on the electronic signal.

12. The method as in claim 1, comprising:

operating the processing unit to control the first and the second polarization rotators to change polarization rotations produced by the first and the second polarization rotators.

13. The method as in claim 1, comprising:

in processing the combination measurement signal in extracting the spectral information of the optical input signal, performing a processing to calibrate a wavelength-dependent effect on the spectral information caused by one or more optical components in the optical spectrum analyzer.

14. The method as in claim 13, wherein the processing to calibrate the wavelength-dependent effect includes a wavelength dependence of rotation angle of at least one of the first and second nonreciprocal polarization rotators.

15. The method as in claim 13, wherein the processing to calibrate the wavelength-dependent effect includes a wavelength dependence loss of an optical delay line in the optical spectrum analyzer.

16. The method as in claim 13, wherein the processing to calibrate the wavelength-dependent effect includes a wavelength dependence of an optical coupler in the optical spectrum analyzer.

17. The method as in claim 13, wherein the processing to calibrate the wavelength-dependent effect includes a wavelength dependence in response of the optical detector in the optical spectrum analyzer.

* * * * *

UNITED STATES PATENT AND TRADEMARK OFFICE
CERTIFICATE OF CORRECTION

PATENT NO. : 7,693,419 B1
APPLICATION NO. : 11/562961
DATED : April 6, 2010
INVENTOR(S) : Xiaojun Chen, Lianshan Yan and X. Steve Yao Page 1 of 1

It is certified that error appears in the above-identified patent and that said Letters Patent is hereby corrected as shown below:

At column 10, line 52, in claim 1, after "operating" delete "the".

At column 10, line 65, in claim 1, after "signal" insert --,--.

At column 11, line 2, in claim 1, after "signal" insert --,--.

At column 11, line 11, in claim 1, after "signal" insert --,--.

At column 12, line 14, in claim 9, delete "covert" and insert --convert--.

Signed and Sealed this
Twenty-second Day of February, 2011

David J. Kappos
*Director of the United States Patent and Trademark Office*